United States Patent Office 2,711,902
Patented June 28, 1955

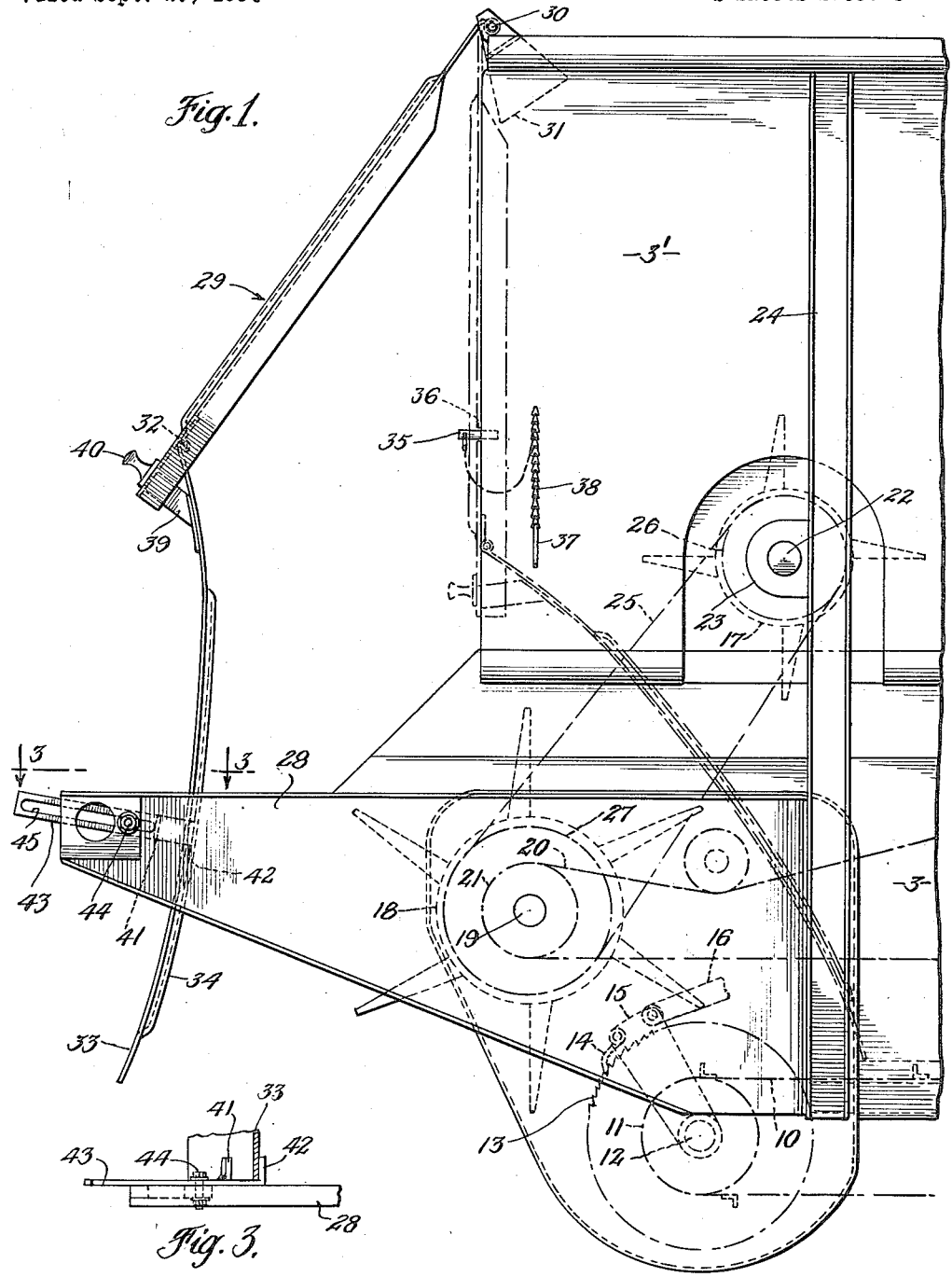

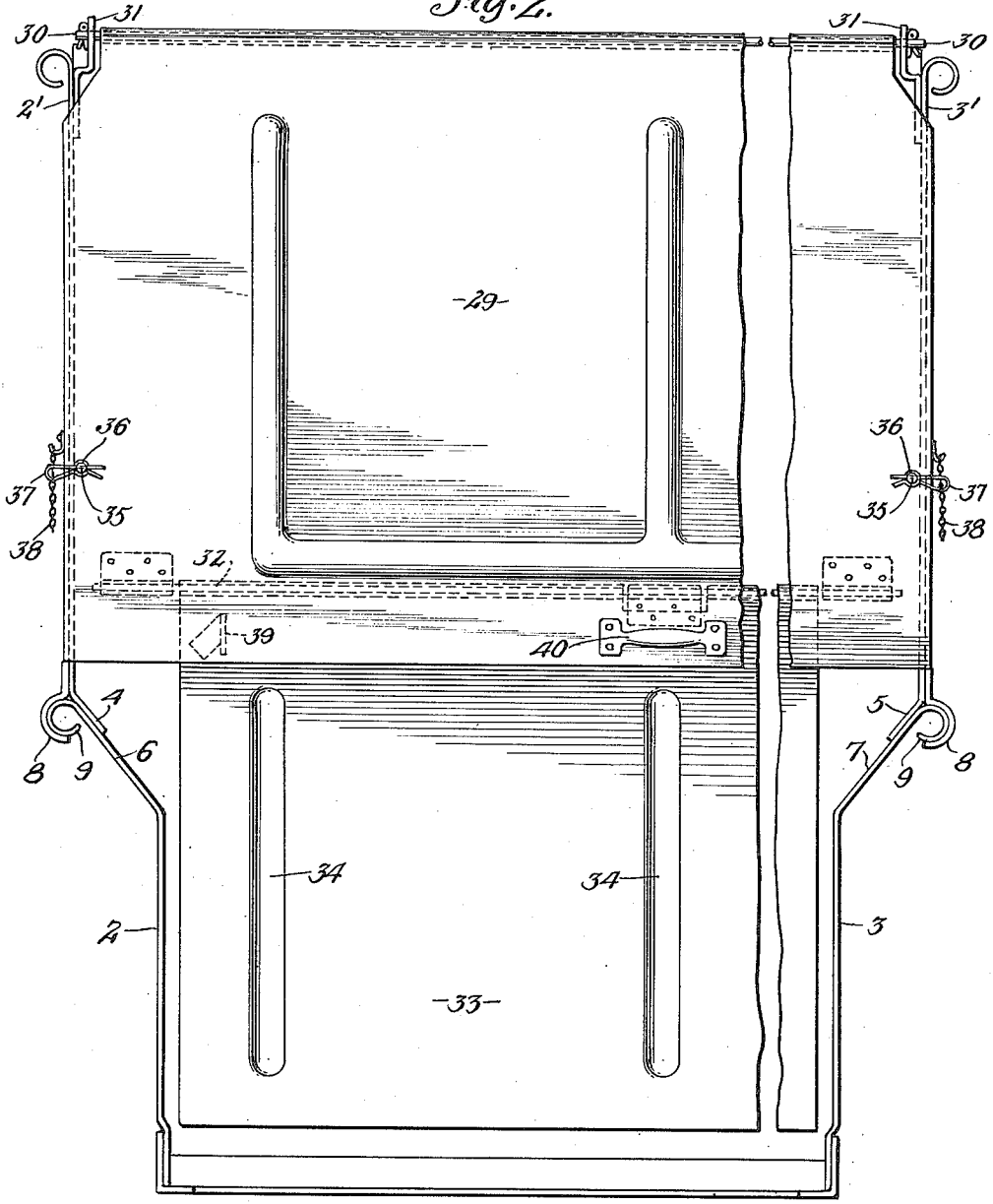

2,711,902

FORAGE BOX END GATE

Charles Q. Martin, Leola, Pa., assignor to The Sperry Corporation, New Holland, Pa., a corporation of Delaware Application September 29, 1954, Serial No. 459,044

9 Claims. (Cl. 275—6)

This invention relates to a combined endgate and discharged material deflector for a self-unloading wagon, hopper or the like.

In accordance with the invention, it is made practical to adapt a usual manure spreader for carrying and automatically discharging ensilage and the like, utilizing the beaters or shredding mechanisms at the discharge end of the spreader for breaking loose and dividing the caked ensilage material so that it will be fed or delivered at a substantially uniform rate into a blower conveyer or the like. The endgate of the invention is adapted to completely close the discharge end of the manure spreader during transit and to thereafter act as a deflector for directing the discharged material from the beaters downwardly into the receiving hopper of a blower conveyer or the like.

In accordance with a primary feature of the invention, the endgate cooperates in a novel manner with the usual rotary beaters of the spreader unloading mechanism to prevent the wagon body contents from binding these beaters so as to substantially resist the commencement of their rotary motion and imposing such a load thereon as to chance risk of damage to the beaters or their driving mechanism. To this end, the endgate attachment of the invention, when in closed position, extends over and completely shields the lower beater from contact with the wagon contents, which is supported thereabove. Where an upper beater also is employed, the lower section of the endgate also extends between the upper and lower beaters to support the wagon contents beneath the upper beater in spaced relation above the lower beater. Thus, upon removal of this lower section of the endgate from between these beaters, the pressure of material on the upper beater is greatly relieved, as is a considerable part of the material binding action thereon, so that rotation of the upper beater may be readily instituted without undue strain on such beater or its driving mechanism. While a portion of the material supported beneath the upper beater will be thus allowed to drop away therefrom into engagement with the lower beater, this will be of sufficiently small volume, and so loosely packed as to constitute no substantial impediment to initiation of rotation of the lower beater.

Also, there is provided means for limiting the relative swinging movement between the upper and lower sections of the endgate beyond a predetermined relatively obtuse angle, whereby positioning of the lower section in open material deflecting position will maintain the upper section in proper open position.

The arrangement is such that the upper gate section, when closed, is secured in a substantially vertical position across the rear end of the manure spreader wagon box and fixedly supports the upper end of the lower section in proper relation whereby it may extend diagonally downwardly between and clear of both beaters.

The presently preferred embodiment of the invention is illustrated in the accompanying drawings, in which:

Figure 1 represents an elevational view of the rear or discharge end of a forage box illustrating the manner in which the invention is combined therewith, the endgate being shown in open position in full lines and in closed position in broken lines;

Figure 2, a partially broken away elevational view looking toward the right in Figure 1, with the endgate in closed position and with the beaters and conveyers omitted; and, Figure 3, a fragmentary section on the line 3—3 of Figure 1, looking in the direction of the arrows.

In the accompanying drawings, the invention is illustrated in its preferred embodiment to a self-unloading wagon of the manure spreader type such as is exemplified by the well known and commercially available New Holland Model 300 Manure Spreader, sold by New Holland Machine Company, New Holland, Pennsylvania.

Such a spreader comprises a more or less conventional wagon box (of which only the rear discharge end portion is illustrated, the supporting wheels and other structure being omitted as unnecessary) including relatively transversely spaced vertical sides 2 and 3 which are built up by extensions 2' and 3' respectively to increase the volumetric capacity of the wagon box. As will be seen by reference to Figure 2, these extensions 2' and 3' have inwardly turned bottom flanges 4 and 5 respectively resting on the upwardly presented outwardly flaring portions 6 and 7 of the sides 2 and 3. These extensions are secured on the sides 2 and 3 by means such as clamp members 8 extending around and beneath the marginal upper edge beadings 9 of the respective sides. Obviously, the wagon box sides, including the portions 2, 2', and 3, 3', may be formed in other manners, as the specific details of the construction and arrangement are not involved in the instant invention.

A suitable conveyer means such as the usual cross-slatted apron conveyer 10 (Figure 1) is disposed for movement rearwardly over the bottom of the wagon box to deliver the contents of the box rearwardly or to the left in Figure 1. This conveyer 10 extends around drive sprockets 11 fixed on a shaft 12 journalled beneath and cross-wise of the wagon box. Intermittent rotary motion is imparted to said shaft through usual means such as a ratchet wheel 13 fixed on shaft 12 for driving engagement by pawl 14 carried by a driving arm 15 oscillatable about shaft 12. Arm 15 may be oscillated through a link or connecting rod 16 from any conventional drive means.

In general, the arrangement of the feed apron or conveyer and its driving means may be similar to that exemplified in the Hybbert U. S. Patent 2,478,583 of September 9, 1949, or by other prior art patents, machines, or publications, and it follows that the details of such arrangement are not essential to the present invention.

It will be seen in Figure 1 that the feed apron or conveyer 10 moves the wagon box contents rearwardly into operative engagement with one or more rotary beaters, preferably in the form of toothed cylinders 17 and 18, which function to shred or finely divide the wagon box contents as it is discharged, thereby preventing the discharge of large clumps or masses of material such as might tend to clog or strain a conveyer which receives such discharged material.

The lower beater 18 is fixed on horizontal shaft 19 which extends transversely and is journalled for rotation between the sides 2 and 3 and driven from any suitable source by a chain or belt 20 operatively disposed around wheel 21 fixed on shaft 19.

Upper beater 17 is similarly fixed on a shaft 22 which extends across the wagon box and has its opposite ends rotatably supported in brackets 23 carried by the reinforcing standards or frame elements 24 of the wagon box. Upper beater 17 is driven through a chain 25 passing around sprockets 26 and 27 keyed on the respective shafts 22 and 19. In general, the arrangement of the beaters 17 and 18 and their driving means may be similar to the disclosure of the Oppenheim U. S. Patent 1,854,599 of April 19, 1932.

Rearwardly projecting supports such as 28 on opposite sides of the wagon box structure normally provide means for supporting a rotary widespread attachment such as is commonly employed with manure spreaders and as is disclosed in the above mentioned Oppenheim patent and others. However, for the purpose of the present invention such an attachment and its function are superfluous, hence the attachment is preferably removed in order to adapt the manure spreader for use with the invention.

Since the manure spreader structure thus far described involves merely conventional structure, the preceding description and the drawings relating thereto are restricted to such parts of the old mechanism as are necessary to facilitate a complete and intelligent understanding of the present invention.

The endgate of the invention serves both as a closure for the discharge end of the wagon box and as a material deflector for confining and directing the discharged material into a specific location, such as the receiving hopper and/or feed conveyer of a conventional forage blower.

Thus the endagte structure comprises an upper plate or section 29 swingably supported along its upper edge on a horizontal pintle 30 which, in turn, is mounted on and between brackets 31 respectively fixed on opposite sides of the wagon box.

Hinged to and supported by the upper gate section 29, as at 32, for movement about a horizontal axis, is a lower plate or section 33. This section 33 is preferably curved in a vertical plane to present a convex upper surface when in closed position, as shown in broken lines in Figure 1. Preferably section 33 is stiffened by vertically extending indented ribs or equivalent means.

In the closed position of the gate, as shown in broken lines in Figure 1, its upper section 29 is secured flush against the vertical end edges of the side wall extensions 2' and 3', as by means of rearwardly projecting pins 35 fixed on these extensions for projection through registering openings 36 in upper plate 29. Cotter pins or keys 37 have portions removably insertable through transverse bores in the projecting ends of these pins 35 to abut against the outer face of plate 29 and prevent rearward swinging thereof. In order that such pins will be readily available at all times it is desirable to fasten them to the wagon box by flexible elements or chains 38.

The lower section 33 of the endgate, in its closed position, as during loading and transporting of the wagon box, extends diagonally between the upper and lower beaters 17 and 18 in spaced relation to both, with its lower edge resting on the feed apron 10, or else supported just above same by the movement limiting means hereafter described.

It will be seen that when the endgate is in its closed position and the wagon box is filled with ensilage or the like material, its lower section 33 completely supports the weight of the material above and clear of the lower beater 18. Also it extends beneath upper beater 17 and supports the material beneath said beater in spaced relation above beater 17. Thus when the endgate sections 29 and 33 are moved from their closed broken line position of Figure 1 to the full line operative position of said Figure, the withdrawal of the lower section 33 from between beaters 17 and 18 will prmit all of that portion of the wagon contents beneath the upper beater to drop away from and clear of the lower portion of said beater, leaving but a relatively small depth of material above and resting on said beater. It has been found that such remaining material above the beater will be insufficient to seriously interfere with the initiation of the rotary movement of the beater 17, as required for the subsequent unloading of the wagon box contents, or to impose undue strain on said beater or its driven mechanism.

Since much of the wagon contents above and adjacent the lower beater 18 will be supported on upper beater 17, only a relatively small amount of such material will normally fall into engagement with beater 17, when gate section 17 is moved to open position. Consequenty such material may offer but slight and inconsequential resistance to the commencement of rotation of the lower beater 17.

In order to connect the upper and lower gate sections for rearward swinging or opening movement together, and to maintain the upper gate section open together with the lower section, there is provided a suitable means for limiting the rearward swinging of the lower section relative to the upper section.

Such a means is exemplified by the abutment arm 39 fixed on lower section 33 below hinge 32 for endwise abutting engagement with the lower end of upper section 29, as shown in Figure 1. Although only one such arm 39 is specifically illustrated, it will be understood that preferably two or more such arms are employed in laterally spaced relation. The second arm, however, due to being positioned on the broken out portion of Figure 2, is not shown.

In the operation of the invention, the endgate sections 29 and 33 will be disposed in closed position while the wagon box is filled and transported to its intended destination, generally the site of a conveyer, whereupon the wagon box is maneuvered into a position with its rear discharge end just above and generally parallel to the conveyer receiving trough or hopper. Then, after manually removing the pins 37 from the rearwardly projecting posts 35, the upper gate section is manually swung rearwardly, a handle 40 being provided on section 29 to facilitate such manual positioning. The rearward swinging of the upper section 29 will be of sufficient extent to fully withdraw the lower section 33 from between the beaters 17 and 18, following which the then free swinging lower end of the lower section is manually positioned for reception between the stop lugs 41 and 42, which are preferably fixed on brackets 43, adjustably secured on the inner faces of laterally opposed extensions 28 by means of bolts 44 disposed through slots 45 in the respective brackets. The upper section 29 is then lowered to permit reception of the lower section between these lugs 41, 42, as shown in Figure 3. It will be seen that the lug 42 will limit the forward swinging of lower section 33 and engagement between the movement limiting arm or means 39 and upper section 29, will, in turn, retain said upper section in the rearwardly swung open position indicated.

With the gate thus in open position, the driving mechanisms for the beaters 17, 18 and conveyer 10 are placed in operation, causing the conveyer 10 to deliver the wagon box contents rearwardly toward the beaters. As the rearwardly moving material is engaged by the beaters (which rotate in a clock-wise direction as seen in Figure 1), it is finely divided by the toothed beaters and expelled rearwardly and generally downwardly from the wagon box. It will be seen that the open gate sections 29 and 33 will permit such expulsion or discharge of material, and will deflect the discharged material downwardly, whereby it will be confined or restricted to a limited area such as might be comprised by the receiving hopper or trough of a cooperating blower conveyer or the like. Obviously the beaters 17 and 18, by finely dividing and moving the rearwardly moving material downwardly, eliminate the necessity for this operation to be performed manually, as is generally required in connection with usual self-unloading forage wagons.

It will be seen that the endgate, when closed, cooperates with the beaters by maintaining them sufficiently clear that they can subsequently commence their operative rotary movement without being unduly impeded by the wagon box contents, and when open, serves to confine the discharged material to a predetermined area. The upper gate section 29 supports the upper edge of the lower section to properly operatively position the lower section between and clear of the beaters 17, 18, and also guides said lower section during its rearward withdrawal from between the beaters to open position. When in open position, as determined by the laterally projecting stud or stop 42, the lower section 33, in turn, cooperates with the upper section, through the intermediary of movement limiting means 39, to retain the upper section 29 also in open position.

In this application I have shown and described only the preferred embodiment of the invention. However, the disclosed mechanism may be modified in form and its several details changed in various ways, all without departing from the invention. Accordingly, the drawings, and description are to be considered as merely illustrative and not as exclusive.

Having thus described my invention, I claim:

1. In a self-unloading wagon including a wagon box having relatively spaced sides, upper and lower beaters rotatable between said sides about horizontal axes adjacent the discharge end of the box, and conveyer means within the box for feeding its contents toward said discharge end, the combination with said box of an endgate comprising an upper section supported on said box for swinging movement about a horizontal axis parallel to and above the beater axes, disengageable means normally securing said upper section to the sides in a fixed vertical position to close said discharge end of the box above said beater axes, a lower section hinged to said upper section for movement about a horizontal axis below that of the upper section, said lower section normally extending diagonally downwardly into the wagon box between said beaters, said sections being swingable rearwardly about the horizontal axis of the upper section to an open position wherein the lower section is withdrawn from between said beaters and spaced rearwardly therefrom and from the discharge end of the wagon box, movement limiting means carried by said endgate and engageable between its said sections for supporting the upper section in open position responsive to adjustment of the lower section to open position, and a releasable connection between the lower section and the wagon box for maintaining said lower section in open position.

2. In a self-unloading wagon including a wagon box having relatively spaced sides, a beater rotatable between said sides about a horizontal axis adjacent the discharge end of said box, and conveyer means within the box for feeding its contents toward said discharge end, the combination with said box of an endgate comprising an upper section supported on said box for swinging movement about a horizontal axis above said beater, disengageable means normally securing said upper section to the sides in a fixed vertical position to close the upper portion of the discharge end of said box, a lower section hinged to said upper section for movement about a horizontal axis below that of the upper section, said lower section normally extending diagonally downwardly into the discharge end of the wagon box above said beater, both of said sections being swingable rearwardly about the horizontal axis of the upper section to an open position wherein the lower section is withdrawn from above said beater and spaced rearwardly from the discharge end of the wagon box, movement limiting means carried by said endgate and engageable between its said sections for supporting the upper section in open position with the lower section, and a releasable connection between the lower section and the wagon box for maintatining said lower section in open position.

3. In a self-unloading wagon including a wagon box having relatively spaced sides, upper and lower beaters rotatable between said sides about horizontal axes adjacent the discharge end of the box, the combination with said box of an endgate comprising an upper section supported on said box for swinging movement about a horizontal axis parallel to and above the beater axes, disengageable means normally securing said upper section to the sides in a fixed substantially vertical position to close the upper portion of the discharge end of the box, a lower section hinged to the upper section for movement about an axis parallel to that of the upper section, said lower section normally extending diagonally downwardly into the wagon box between said beaters, said sections being swingable rearwardly about the said horizontal axis, to an open position wherein said lower section is withdrawn from between said beaters and spaced rearwardly therefrom, movement limiting means carried by said endgate and engageable between its sections for supporting the upper section in open position responsive to adjustment of the lower section to open position, and a releasable connection between the lower section and the wagon box for maintaining said lower section in open position.

4. In a self-unloading wagon including a wagon box having relatively spaced sides, upper and lower beaters rotatable between said sides about horizontal axes adjacent the discharge end of the box, and conveyer means within the box for feeding its contents toward said discharge end; the combination with said box of an endgate comprising an upper section mounted in said box for swinging movement about a horizontal axis parallel to and above the beater axes, a lower section hinged to said upper section for movement about a horizontal axes below that of the upper section, said lower section normally extending diagonally downwardly into the wagon box between said beaters, said sections being swingable rearwardly about the horizontal axis of the upper section to an open position wherein the lower section is withdrawn from between said beaters and spaced rearwardly therefrom and from the discharge end of the wagon box, movement limiting means carried by said endgate and engageable between its said sections for supporting the upper section in open position responsive to adjustment of the lower section to open position, and a releasable connection between the lower section and the wagon box for maintaining said lower section in open position.

5. In a self-unloading wagon including a wagon box having relatively spaced sides, upper and lower beaters rotatable between said sides about horizontal axes adjacent the discharge end of the box, the combination with said box of an endgate comprising an upper section supported for swinging movement in said box about a horizontal axes parallel to and above the beater axes, a lower section hinged to said upper section for movement about a horizontal axis below that of the upper section, said lower section normally extending diagonally downwardly into the wagon box between said beaters, said sections being swingable rearwardly about the horizontal axis of the upper section to an open position wherein the lower section is withdrawn from between said beaters and spaced rearwardly therefrom, movement limiting means carried by said endgate and engageable between its said sections for supporting the upper section in an open position responsive to adjustment of the lower section to open position, and a releasable connection between the lower section and the wagon box for maintaining said lower section in open position.

6. In a self-unloading wagon including a wagon box having relatively spaced sides, upper and lower beaters rotatable between said sides about horizontal axes adjacent the discharge end of the box, and conveyer means within the box for feeding its contents toward said discharge end, the combination with said box of an endgate comprising an upper section supported on said box for swinging movement about a horizontal axis parallel to and above the beater axes, disengageable means normally securing said upper section to the sides in a fixed vertical position to close said dischage end of the box above said beater axes, a lower section hinged to said upper section for movement about a horizontal axis below that of the upper section, said lower section extending diagonally downwardly into the wagon box between said beaters, said sections being swingable rearwardly about the horizontal axis of the upper section to an open position wherein the lower section is withdrawn from between said beaters and spaced rearwardly therefrom, and a releasable connection between the lower section and the wagon box for maintaining said lower section in open position.

7. In a self-unloading wagon including a wagon box having relatively spaced sides, upper and lower beaters rotatable between said sides about horizontal axes adjacent the discharge end of the box, and means within the box for feeding its contents toward said discharge end, the combination with said box of an endgate comprising an upper section supported on the box for swinging movement about a horizontal axis parallel to and above the beater axes, disengageable means normally securing said upper section to the wagon box in a fixed position to close the discharge end of the box above said beater axes, a lower section hinged to said upper section for movement about a horizontal axis below that of the upper section, said lower section normally extending diagonally downwardly into the wagon box between said beaters, said sections being swingable rearwardly about the horizontal axis of the upper section to an open position wherein the lower section is withdrawn from between said beaters and spaced rearwardly therefrom, movement limiting means carried by said endgate and engageable between its sections for supporting the upper section in open position responsive to adjustment of the lower section to open position, and means for maintaining said lower section in open position.

8. In a self-unloading wagon including a wagon box having relatively spaced sides, upper and lower beaters rotatable between said sides about horizontal axes adjacent the discharge end of the box, and means within the box for feeding its contents toward said discharge end, the combination with said box of an endgate comprising an upper section supported on said box for swinging movement about a horizontal axis parallel to and above the beater axes, a lower section hinged to said upper section for movement about a horizontal axis below that of the upper section, said lower section normally extending diagonally downwardly into the wagon box between said beaters, said sections being swingable rearwardly about the horizontal axis of the upper section to an open position wherein the lower section is withdrawn from between said beaters and spaced rearwardly therefrom, and means for maintaining said upper and lower sections in open position.

9. In a self-unloading wagon including a wagon box having relatively spaced sides, upper and lower beaters rotatable between said sides about horizontal axes adjacent the discharge end of the box, and means within the box for feeding its contents toward said discharge end, the combination with said box of an endgate comprising an upper section supported on the box for swinging movement about a horizontal axis parallel to and above the beater axes, a lower section hinged to said upper section for movement about a horizontal axis below that of the upper section, said lower section normally extending diagonally downwardly into the wagon box between said beaters, said sections being swingable rearwardly about the horizontal axis of the upper section to an open position wherein the lower section is withdrawn from between said beaters and spaced rearwardly therefrom, and movement limiting means carried by said endgate and engageable between its said sections for supporting the said sections in open position responsive to adjustment of the lower section to open position.

References Cited in the file of this patent

UNITED STATES PATENTS

| Number | Name | Date |
|---|---|---|
| 731,539 | Brown | June 23, 1903 |
| 835,641 | Sams | Nov. 13, 1906 |
| 1,123,834 | Binkley | Jan. 5, 1915 |
| 1,765,993 | Neighbour | June 24, 1930 |
| 2,057,555 | Clark et al. | Oct. 13, 1936 |